Patented Aug. 18, 1942

2,293,619

UNITED STATES PATENT OFFICE 2,293,619

ART OF MAKING HEXAMETHYLENE-TETRAMINE

Emil E. Novotny and George Karl Vogelsang, Philadelphia, Pa., assignors to Durite Plastics, Incorporated, Philadelphia, Pa., a corporation of Pennsylvania No Drawing. Application January 12, 1939, Serial No. 250,499

12 Claims. (Cl. 260—238)

This invention relates to methods for isolating or recovering hexamethylenetetramine from mixtures containing said substances in appreciable amounts. More specifically stated, the invention concerns itself with methods for isolating or recovering hexamethylenetetramine from mixtures which also contain other ingredients which are volatile and which can, therefore, exist in a vapor state under conditions of temperature and pressure at which hexamethylenetetramine normally co-exists in the solid state.

Hexamethylenetetramine is generally manufactured on a commercial scale by passing gaseous ammonia into a concentrated formaldehyde solution and evaporating the same. The temperature of the reaction mixture must be kept low by cooling to prevent side reactions and to procure a high yield. The evaporation must be conducted under reduced pressure and small additional quantities of ammonia must be passed in to make up for the ammonia which is split off from the hexamethylenetetramine by hydrolysis.

The present commercial method has several serious disadvantages and drawbacks. In the first place, hexamethylenetetramine has a very strong affinity for water and gives up the last traces very slowly, even though a high vacuum be employed. Secondly, as the concentration of the hexamethylenetetramine increases a sludge or slurry comes into being and in this undesirable condition it tends to settle and cake on the apparatus so that it is removed only with considerable difficulty. Thirdly, the removal of the hexamethylenetetramine from the evaporator is far from being a simple matter. The product may be removed while still in the moist form and the final drying may be conducted in large drying ovens. Finally, the manufacture of hexamethylenetetramine after the above manner for the obtainment of a yield of 90% or over requires a rather involved and expensive installation.

The primary object of the present invention is to provide a method for isolating or recovering hexamethylenetetramine which will overcome and obviate each of the foregoing drawbacks and disadvantages.

Another object is to provide a method for isolating or recovering hexamethylenetetramine from mixtures containing said substance in appreciable amounts, which method is independent of the physical state of the mixture.

Another object is to provide a relatively simple method for isolating hexamethylenetetramine which is highly efficient and capable of producing a high yield of relatively pure product.

A further object is to provide a method of recovery which lends itself to being practiced on a large commercial scale by means of relatively simple and inexpensive apparatus.

Still another object is to provide a relatively simple and efficient method of recovery which lends itself readily to being carried out in a continuous operation.

In its very essence, the method of the present invention consists in bringing a mixture of materials, containing hexamethylenetetramine as well as other ingredients which are volatile and which can, therefore, exist in the vapor phase under conditions of temperature and pressure at which hexamethylenetetramine is normally in the solid phase, into contact with a fluid medium maintained at such temperatures that the hexamethylenetetramine can condense or deposit itself out in its solid phase while the non-hexamethylenetetramine constituents remain or are converted to the gaseous phase.

It is to be noted that the method of the invention is wholly independent of the physical state of the mixture containing the hexamethylenetetramine, provided that the ingredients from which the hexamethylenetetramine is to be separated are volatile and can, therefore, exist in the vapor phase under conditions of temperature and pressure at which hexamethylenetetramine normally co-exists in a solid state. Thus, the mixture may be solid, liquid or gaseous, or a combination of two or more of these physical states.

The all important contact fluid medium may be organic or inorganic in nature. Among the inorganic fluids the most suitable are mercury and gallium. However, for reasons of convenience and economy inert organic liquids are far better suited for the purpose of the present invention. Among such organic liquids may be mentioned all those that are substantially non-reactive towards ammonia, formaldehyde or hexamethylenetetramine and, furthermore, are virtually non-volatile at temperatures encountered in the carrying out of the present invention. Specifically, saturated hydrocarbons and to a lesser extent unsaturated hydrocarbons, aliphatic or aromatic, are suitable. Also usuable are stable high boiling chlorinating compounds, more particularly some chlorinated biphenyls. Among usable contacting fluids the higher saturated aliphatic hydrocarbons or heavy mineral oils, preferably of a water-white type such as Russian mineral oil, etc., are preeminent.

It has already been stated that the method of the invention is wholly independent of the physical state of the mixture containing the hexamethylenetetramine. It is possible to produce hexamethylenetetramine by reacting anhydrous ammonia with vaporized aqueous formaldehyde at temperatures at which the hexamethylenetetramine is in the gaseous phase. This vapor phase method of synthesizing hexamethylenetetramine lends itself admirably for use in conjunction with the method of recovering the hexamethylenetetramine as described in the present invention. On the other hand, if the raw materials for the making of the hexamethylenetetramine be gaseous ammonia and commercial aqueous formaldehyde then we prefer to introduce the ammonia into the formaldehyde solution until there is approximately a 5% surplus of ammonia. A further modification is to first subject the above prepared hexamethylenetetramine solution to partial evaporation with the view of concentrating the hexametylenetetramine.

The vaporized mixture containing the hexamethylenetetramine or the aqueous or aqueous methanol-containing liquid solution containing the hexamethylenetetramine is passed into the fluid contacting medium. The fluid contacting medium, which may be water-white paraffin oil, is maintained at a temperature at which the hexamethylenetetramine readily condenses or deposits itself out in the solid phase, the said temperature, however, being such that the nonhexaconstituents remain in the gaseous phase. The best results have been obtained when the temperature of the contacting fluid is maintained between 240° and 300° F., a temperature of about 275° F. being eminently suitable in the case of an organic contacting fluid, or a temperature of between 235° and 255° F. in the case of a metallic contacting fluid such as mercury or gallium. The inert contacting fluid may be contained in one or more kettles or towers connected in a series. It is not absolutely necessary that the same temperature be maintained in each kettle or tower, nor is it necessary to use large quantities of contacting fluid. If a plurality of kettles is used one or more of the kettles may serve as scrubbers. For most practical purposes, one small scrubbing tower is all that is necessary and with suitable design of the main tower such an auxiliary scrubber may be dispensed with. The contacting fluid in the scrubber may be maintained at a temperature of about 250° to 260° F. Means may preferably be provided to prevent the mechanical carry over of the contacting fluid.

Briefly then, the vaporized mixture containing the hexamethylenetetramine or alternatively the aqueous solution containing the same is passed into the system to make contact with the fluid which is maintained at a temperature of between 240° and 300° F. The hexamethylenetetramine will condense or deposit itself out in a more or less granular condition. In the event that the contacting fluid is mercury or gallium the hexamethylenetetramine will float to the surface, whereas if the contacting fluid be organic such as a mineral oil the hexamethylenetetramine will be partly suspended in the oil and partly it will settle on to the sides of the equipment. The water, excess ammonia, methanol, etc. remain in the gaseous phase and will pass out of contact with the temporating fluid. This water-containing mixture may be passed through a suitable fractionating column for the purpose of recovering any methanol it may contain.

In practice it has been found that there is a tendency for considerable foaming to occur when an inert oil is used, particularly after considerable amounts of hexamethylenetetramine have accumulated. This factor should be taken into consideration when designing the equipment and it has been found desirable to provide means to agitate or stir the inert oil during the process. Not only does such stirring serve to break down the foam, but it also prevents caking of the hexamethylenetetramine. The agitation may be achieved either through the use of suitable stirring devices or through circulating pumps.

Where mercury or gallium is used as the contacting fluid, it is a very simple matter to separate the hexamethylenetetramine, as for example by filtration. In the instance where organic fluids are used, the hexamethylenetetramine may be readily separated from the bulk of the inert fluid in any suitable manner such as settling by gravity, filtration, centrifuging or a combination of several of these methods. The separated hexamethylenetetramine may be further purified by being separated from the last traces of organic contacting fluid by extraction with a suitable solvent. Ethylene dichloride and carbon tetrachloride, as well as many hydrocarbons and other chlorinated compounds, are well suited for this purpose. Ethylene dichloride is particularly suitable because it is relatively volatile, not very toxic and does not introduce a serious fire hazard, nor is it unduly corrosive to the equipment.

It is interesting to note that when employing an organic contacting fluid in practicing the teachings of this invention, the optimum temperature is in the vicinity of 275° F., whereas if a fluid, such as metallic mercury or gallium, is used, the temperature best suited for the precipitation or deposition of the hexamethylenetetramine is between 235° and 255° F.

In the isolation of hexamethylenetetramine after the manner of the present invention, various external pressures may be employed and while we have in the illustrations assumed atmospheric pressures, nevertheless pressures above or below atmospheric are equally operative. However, we find atmospheric pressure is preferable to sub-atmospheric pressure and, further, that while pressures higher than atmospheric work very well and have the advantage in permitting the use of a more compact equipment, there is the disadvantage that the equipment must be of heavier construction so as to withstand such higher pressures. There is a definite limit to the upper pressure that can be employed due to the fact that in the isolation of the hexamethylenetetramine from the water we are dependent upon the transition of the hexamethylenetetramine from the gaseous phase to the solid phase without the intermediate liquid phase. If the pressures for the temperatures employed be excessive, then hexamethylenetetramine in the liquid phase usually contaminated by water separates out and this may seriously affect the operation of the system. In practice the maximum pressure that can be employed is in the vicinity of 90 pounds.

The method of the present invention lends itself readily to a continuous operation.

In conclusion it should be noted that although we have described the invention in considerable detail and therefore utilized several specific terms and language, it is understood that the foregoing disclosure is illustrative and not restrictive and that the appended claims should be construed as broadly as permissible in view of the prior art.

We claim:

1. The method of isolating and recovering hexamethylenetetramine from aqueous-methanol containing mixtures, which comprises bringing the said mixtures into contact with a liquid medium which is a non-solvent for hexamethylenetetramine and which is substantially stable and non-volatile under the conditions of use, maintaining said liquid medium within the range of temperatures at which the hexamethylenetetramine can condense or deposit itself out in the solid state and the non-hexamethylenetetramine constituents exist in the vapor state, leading said non-hexamethylenetetramine vapors out of the system to a methanol recovery unit, and separating the deposited hexamethylenetetramine from said non-solvent liquid contacting medium.

2. The method of isolating or recovering hexamethylene tetramine from aqueous-methanol containing mixtures which comprises bringing the said mixtures into contact with an organic liquid medium which is a non-solvent for hexamethylenetetramine and which is substantially stable and non-volatile under the conditions of use, maintaining said liquid medium within the range of temperatures of from 240° F. to 300° F. so that the hexamethylenetetramine will condense or deposit itself out in the solid state and the water and methanol exist in the vapor state, leading said water and methanol vapors out of the system to a methanol recovery unit, and separating the deposited hexamethylenetetramine from said non-solvent liquid contacting medium.

3. The method of isolating and recovering hexamethylenetetramine from aqueous-methanol containing mixtures, which comprises bringing the said mixtures into contact with a mineral oil which is a solvent for hexamethylenetetramine and which is substantially stable and non-volatile under the conditions of use, maintaining said mineral oil within the range of temperatures at which the hexamethylenetetramine can condense or deposit itself out in the solid state and the non-hexamethylenetetramine constituents exist in the vapor state, leading the non-hexamethylenetetramine vapors out of the system to a methanol recovery unit, separating the deposited hexamethylenetetramine from the mineral oil, and extracting the adhering mineral oil with a solvent for the same.

4. The method of isolating and recovering hexamethylenetetramine from aqueous-methanol containing mixtures, which comprises bringing the said mixtures into contact with a mineral oil which is a non-solvent for hexamethylenetetramine and which is substantially stable and non-volatile under the conditions of use, maintaining said mineral oil within the range of temperatures of from 240° F. to 300° F., so that the hexamethylenetetramine will condense or deposit itself out in the solid state and the non-hexamethylenetetramine constitutents exist in the vapor state, leading the non-hexamethylenetetramine vapors out of the system to a methanol recovery unit, separating the deposited hexamethylenetetramine from the mineral oil, and extracting the adhering mineral oil with a solvent for the same.

5. The method of isolating and recovering hexamethylenetetramine from a mixture containing ingredients which are volatile and can exist in the vapor phase under conditions of temperature and pressure at which hexamethylenetetramine co-exists in the solid phase, at least one of the ingredients of said mixture being a substance which, in its liquid phase, is a solvent for hexamethylenetetramine, said method comprising the steps of bringing said mixture into contact with a liquid medium which is a non-solvent for hexamethylenetetramine and which is substantially stable and non-volatile under the conditions of use, maintaining said liquid medium within the range of temperature at which the hexamethylenetetramine can condense or deposit itself out in the solid phase and the other ingredients of the mixture exist in the vapor phase, and separating the deposited hexamethylenetetramine from said non-solvent liquid contacting medium.

6. The method of isolating and recovering hexamethylenetetramine from a mixture containing ingredients which are volatile and can exist in the vapor phase under conditions of temperature and pressure at which hexamethylenetetramine co-exists in the solid phase, at least one of the ingredients of said mixture being a substance which, in its liquid phase, is a solvent for hexamethylenetetramine, said method comprising the steps of bringing said mixture into contact with a liquid medium which is a non-solvent for hexamethylenetetramine and which is substantially stable and non-volatile under the conditions of use, maintaining said liquid medium within the range of temperature of from 240° F. to 300° F. so that the hexamethylenetetramine will condense or deposit itself out in the solid phase and the other ingredients of the mixture exist in the vapor phase, and separating the deposited hexamethylenetetramine from said non-solvent liquid contacting medium.

7. The method of isolating and recovering hexamethylenetetramine from a mixture containing ingredients which are volatile and can exist in the vapor phase under conditions of temperature and pressure at which hexamethylenetetramine co-exists in the solid phrase, at least one of the ingredients of said mixture being a substance which, in its liquid phase, is a solvent for hexamethylenetetramine, said method comprising the steps of bringing said mixture into contact with an inorganic liquid medium which is a non-solvent for hexamethylenetetramine and which is substantially stable and non-volatile under the conditions of use, maintaining said liquid medium within the range of temperature at which the hexamethylenetetramine can condense or deposit itself out in the solid phase and the other ingredients of the mixture exist in the vapor phase, and separating the deposited hexamethylenetetramine from said non-solvent liquid contacting medium.

8. The method of isolating and recovering hexamethylenetetramine from a mixture containing ingredients which are volatile and can exist in the vapor phase under conditions of temperature and pressure at which hexamethylenetetramine co-exists in the solid phase, at least one of the ingredients of said mixture being a substance, which, in its liquid phase, is a solvent for hexamethylenetetramine, said method comprising the steps of bringing said mixture into contact with an organic liquid medium which is a non-solvent for hexamethylenetetramine and which is substantially stable and non-volatile under the conditions of use, maintaining said liquid medium within the range of temperature at which the hexamethyleneteramine can condense or deposit itself out in the solid phase and the other ingredients of the mixture exist in the vapor phase, and separating the deposited hexamethylenetetramine from said non-solvent liquid contacting medium.

9. The method of isolating and recovering hexamethylenetetramine from a mixture containing ingredients which are volatile and can exist in the vapor phase under conditions of temperature and pressure at which hexamethylenetetramine co-exists in the solid phase, at least one of the ingredients of said mixture being a substance which, in its liquid phase, is a solvent for hexamethylenetetramine, said method comprising the steps of bringing said mixture into contact with a chlorinated organic liquid medium which is a non-solvent for hexamethylenetetramine and which is substantially stable and non-volatile under the conditions of use, maintaining said liquid medium within the range of temperature at which the hexamethylenetetramine can condense or deposit itself out in the solid phase and the other ingredients of the mixture exist in the vapor phase, and separating the deposited hexamethylenetetramine from said non-solvent liquid contacting medium.

10. The method of isolating and recovering hexamethylenetetramine from a mixture containing ingredients which are volatile and can exist in the vapor phase under conditions of temperature and pressure at which hexamethylenetetramine co-exists in the solid phase, at least one of the ingredients of said mixture being a substance which, in its liquid phase, is a solvent for hexamethylenetetramine, said method comprising the steps of bringing said mixture into contact with a mineral oil which is a non-solvent for hexamethylenetetramine and which is substantially stable and non-volatile under the conditions of use, maintaining said mineral oil within the range of temperature at which the hexamethylenetetramine can condense or deposit itself out in the solid phase and the other ingredients of the mixture exist in the vapor phase, and separating the deposited hexamethylenetetramine from said mineral oil.

11. The method of isolating and recovering hexamethylenetetramine from a mixture containing ingredients which are volatile and can exist in the vapor phase under conditions of temperature and pressure at which hexamethylenetetramine co-exists in the solid phase, at least one of the ingredients of said mixture being a substance which, in its liquid phase, is a solvent for hexamethylenetetramine, said method comprising the steps of bringing said mixture into contact with a liquid medium which is a non-solvent for hexamethylenetetramine and which is substantially stable and non-volatile under the conditions of use, maintaining said liquid medium within the range of temperature of from 240° F. to 300° F. so that the hexamethylenetetramine will condense or deposit itself out in the solid state and the other ingredients of the mixture exist in the vapor phase, and extracting the adhering liquid medium by means of a solvent for said organic liquid.

12. The method of isolating and recovering hexamethylenetetramine from a mixture containing ingredients which are volatile and can exist in the vapor phase under conditions of temperature and pressure at which hexamethylenetetramine co-exists in the solid phase, at least one of the ingredients of said mixture being a substance which, in its liquid phase, is a solvent for hexamethylenetetramine, said method comprising the steps of bringing said mixture into contact with a mineral oil which is a non-solvent for hexamethylenetetramine and which is substantially stable and non-volatile under the conditions of use, maintaining said mineral oil within the range of temperature of from 340° F. to 300° F. so that the hexamethylenetetramine will condense or deposit itself out in the solid state and the other ingredients of the mixture exist in the vapor phase, and extracting the adhering mineral oil by means of a solvent for said mineral oil.

EMIL E. NOVOTNY.
GEORGE KARL VOGELSANG.